(12) United States Patent
Hwang et al.

(10) Patent No.: US 10,257,177 B2
(45) Date of Patent: Apr. 9, 2019

(54) ELECTRONIC DEVICE AND METHOD FOR MANAGING RE-ENROLLMENT

(71) Applicant: Samsung Electronics Co., Ltd., Gyeonggi-do (KR)

(72) Inventors: Suk-Joon Hwang, Seoul (KR);
Min-Ho Song, Gyeonggi-do (KR);
Chang-Hyeon Lim, Seoul (KR);
Dong-Ho Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 411 days.

(21) Appl. No.: 14/842,144

(22) Filed: Sep. 1, 2015

(65) Prior Publication Data
US 2016/0065557 A1 Mar. 3, 2016

(30) Foreign Application Priority Data
Sep. 1, 2014 (KR) .................. 10-2014-0115730

(51) Int. Cl.
*G06F 17/00* (2006.01)
*H04L 29/06* (2006.01)

(52) U.S. Cl.
CPC .................. *H04L 63/08* (2013.01)

(58) Field of Classification Search
CPC ..... H04W 60/00; H04W 60/02; H04W 60/06; H04L 63/08
See application file for complete search history.

(56) References Cited

U.S. PATENT DOCUMENTS

| 8,522,084 B2 | 8/2013 | Lee et al. | |
| 9,705,919 B1* | 7/2017 | Jacobsen | H04L 63/20 |
| 2001/0026618 A1 | 10/2001 | Van Wie et al. | |
| 2004/0083370 A1* | 4/2004 | de Jong | G06F 21/10 713/182 |
| 2007/0250596 A1* | 10/2007 | Baugher | H04L 12/2856 709/218 |
| 2011/0252240 A1* | 10/2011 | Freedman | H04L 63/02 713/169 |
| 2012/0303583 A1 | 11/2012 | Chowdhry | |

(Continued)

FOREIGN PATENT DOCUMENTS

| JP | 2002-351843 | 12/2002 |
| JP | 2004-030600 | 1/2004 |

(Continued)

OTHER PUBLICATIONS

International Search Report dated Dec. 10, 2015 issued in counterpart application No. PCT/KR2015/009199, 13 pages.

*Primary Examiner* — Trong H Nguyen
(74) *Attorney, Agent, or Firm* — The Farrell Law Firm, P.C.

(57) ABSTRACT

The present disclosure relates to electronic devices and methods for managing re-enrollment. According to the present disclosure, a method for managing re-enrollment of an electronic device may comprise storing data necessary for re-enrollment to manage the electronic device, reading the stored data corresponding to any one of initialization of the electronic device and deletion of a pre-stored management agent, sending a request for information necessary for authentication using the read data, and receiving at least one of the information necessary for authentication and a management agent installation file received corresponding to the request.

19 Claims, 9 Drawing Sheets

(56) References Cited

U.S. PATENT DOCUMENTS

| | | |
|---|---|---|
| 2013/0178190 A1 | 7/2013 | Cell et al. |
| 2014/0137232 A1 | 5/2014 | Kobayashi |
| 2015/0207697 A1* | 7/2015 | Satapathy ........... H04L 41/5041 709/203 |

FOREIGN PATENT DOCUMENTS

| | | |
|---|---|---|
| JP | 2014-099030 | 5/2014 |
| JP | 2014-153932 | 8/2014 |
| KR | 1020110024003 | 3/2011 |

* cited by examiner

ELECTRONIC DEVICE AND METHOD FOR MANAGING RE-ENROLLMENT

PRIORITY

This application claims priority under 35 U.S.C. § 119(a) to a Korean patent application filed in the Korean Intellectual Property Office on Sep. 1, 2014 and assigned Serial No. 10-2014-0115730, the content of which is incorporated herein by reference.

BACKGROUND

1. Field of the Invention

The present disclosure relates to electronic devices and methods for managing re-enrollment.

2. Description of the Related Art

Recently, portable electronic devices offer more various services and additional functions. There are being developed various applications executable on electronic devices to meet the demand of diverse users and to raise the utility of electronic devices.

As such, the growing performance of electronic devices may cause a threat to security. For example, camera-equipped electronic devices may be used to steal information from companies, business sectors, or organizations. For those reasons, business operators desire to prevent confidential information from leaking through the electronic devices of users hired by them. To live up to such demand, electronic device managing systems are in development.

FIG. 1 is a block diagram illustrating an electronic device managing system according to the prior art.

Referring to FIG. 1, the electronic device managing system may include an electronic device 110 and a business operator server 120. The business operator server 120 may include a mobile device management (MDM) server that remotely manages the electronic device 110.

In order for remote management of the electronic device 110, the business operator server 120 may transmit, to the electronic device 110, emails, short message service (SMS) messages, or multimedia messaging service (MMS) messages including information for installing a management agent. From this, the user of the electronic device 110 may be aware of the necessity of the management agent, and the electronic device 110 may receive the management agent from the business operator server 120 and may install the received management agent. The electronic device 110 may send an identifier of the electronic device to the business operator server 120 to request management and enrollment. Thereafter, the business operator server may enroll the electronic device 110 through an authentication process.

As such, the business operator server may control the electronic device 110 by installing the management agent on the electronic device 110 and may install, update, block, or delete functions or applications running on the electronic device 110.

In the conventional electronic device managing system, when the electronic device 110 is initialized so that the management agent enrolled in the business operator server is deleted from the electronic device 110, the business operator server 120 cannot manage the electronic device 110 any longer.

Further, when the image obtaining unit 110 is lost or the management agent is deleted beyond the user's intention, the user needs to perform the process of enrolling the electronic device 110 from the beginning.

Accordingly, there is the need of simplifying the initial enrollment process while minimizing security missing even when the management agent is deleted.

The above information is presented as background information only to assist with an understanding of the present disclosure. No determination has been made, and no assertion is made, as to whether any of the above might be applicable as prior art with regard to the present disclosure.

SUMMARY

Thus, according to embodiments of the present disclosure, there are provided an electronic device and method for managing re-enrollment of an electronic device.

To achieve the above objects, according to an embodiment of the present disclosure, a method for managing re-enrollment of an electronic device may comprise storing data necessary for re-enrollment to manage the electronic device, reading the stored data corresponding to any one of initialization of the electronic device and deletion of a pre-stored management agent, sending a request for information necessary for authentication using the read data, and receiving at least one of the information necessary for authentication and a management agent installation file received corresponding to the request.

To achieve the above objects, according to an embodiment of the present disclosure, an electronic device managing re-enrollment may comprise a memory storing data necessary for re-enrollment while performing enrollment for management of the electronic device and a controller performing control to read the stored data corresponding to sensing any one of initialization of the electronic device and deletion of a pre-stored management agent, to send a request for information necessary for authentication using the read data, to install the information necessary for authentication corresponding to reception of at least one of a management agent installation file and the information necessary for authentication received corresponding to the request, and to transmit a message to request re-enrollment for management.

To achieve the above objects, according to an embodiment of the present disclosure, a method for, managing re-enrollment of an electronic device may comprise, when the electronic device is initialized, sending a request for information necessary for authentication to a relay server using pre-stored data by the electronic device, receiving at least one of the information necessary for authentication and a management agent installation file of a corresponding business operator server from the relay server by the electronic device, installing a management agent and transmitting a message to request re-enrollment for management to the business operator server by the electronic device, and receiving, from the business operator server, a response including the data necessary for re-enrollment by the electronic device.

To achieve the above objects, according to an embodiment of the present disclosure, a system for managing re-enrollment of an electronic device may comprise an electronic device sending a request for information necessary for authentication using pre-stored data when the electronic device is initialized, a relay server determining a business operator managing the electronic device and transmitting at least one of a management agent installation file and information necessary for authenticating a corresponding business operator server to the electronic device when receiving the request, and a business operator server, wherein the electronic device may install a management agent and transmit a message to request re-enrollment for management to the business operator server, and the business operator server may perform authentication on the electronic device and transmit a response including data necessary for re-enrollment to the electronic device.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
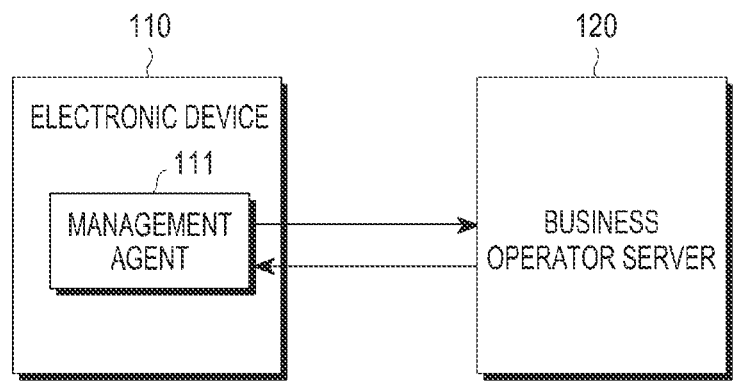
FIG. 1 is a block diagram illustrating an electronic device managing system according to the prior art.

Hereinafter, embodiments of the present disclosure are described in detail with reference to the accompanying drawings. Various changes may be made to the present disclosure, and the present disclosure may come with a diversity of embodiments. Some embodiments of the present disclosure are shown and described in connection with the drawings. However, it should be appreciated that the present disclosure is not limited to the embodiments, and all changes and/or equivalents or replacements thereto also belong to the scope of the present disclosure. The same or similar reference denotations are used to refer to the same or similar elements throughout the specification and the drawings.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the above-listed items. For examples, "A or B" may include A, or include B, or include both A and B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other. For example, a first component may be denoted a second component, and vice versa without departing from the scope of the present disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

The terms as used herein are provided merely to describe some embodiments thereof, but not to limit the present disclosure. It is to be understood that the singular forms "a," "an," and "the" include plural references unless the context clearly dictates otherwise.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an embodiment of the present disclosure, an electronic device as disclosed herein may be a device with a display function. For example, examples of the electronic device may include, but is not limited to, a smartphone, a tablet PC, a mobile phone, a video phone, an e-book reader, a desktop PC (personal computer), a laptop computer, a netbook computer, a PDA (personal digital assistant), a PMP (portable multimedia player), an MP3 player, a mobile medical device, a camera, or a wearable device (e.g., a head-mounted device (HMD), electronic clothes, an electronic bracelet, an electronic necklace, an electronic appcessory, an electronic tattoo, or a smart watch).

According to an embodiment of the present disclosure, the electronic device may be a smart home appliance with a display function. For example, examples of the smart home appliance may include, but is not limited to, a television, a digital video disk (DVD) player, an audio player, a refrigerator, an air conditioner, a vacuum cleaner, an oven, a microwave oven, a washer, a drier, an air cleaner, a set-top box, a TV box (e.g., Samsung HomeSync™, Apple TV™, or Google TV™), a gaming console, an electronic dictionary, a camcorder, or an electronic picture frame.

According to an embodiment of the present disclosure, examples of the electronic device may include, but is not limited to, various medical devices (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), avionics, security devices, vehicular head units, industrial or home robots, automatic teller's machines (ATMs), or point of sales (POS) devices.

According to various embodiments of the disclosure, examples of the electronic device may include, but is not limited to, part of furniture or building/structure with a biometric function, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible device. According to an embodiment of the present disclosure, the electronic device is not limited to the above-listed devices.

Various embodiments of the present disclosure are now described with reference to the accompanying drawings. As used herein, the term "user" may denote a human or another device using the electronic device.

Figure 2:
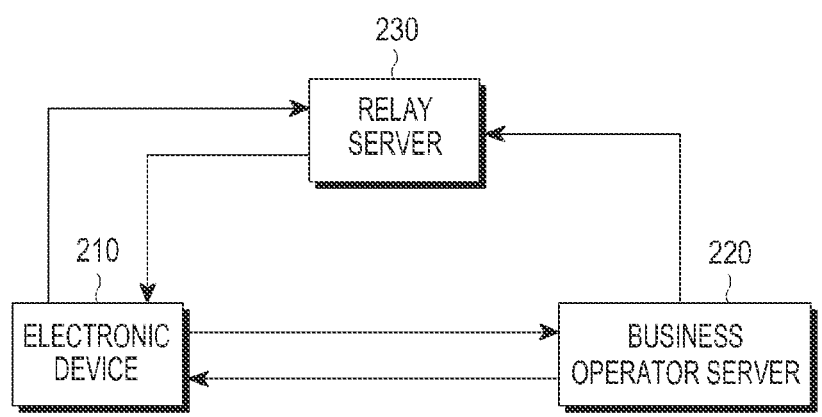
FIG. 2 is a block diagram illustrating an electronic device managing system according to an embodiment of the present disclosure.

FIG. 2 is a block diagram illustrating an electronic device managing system according to an embodiment of the present disclosure.

Referring to FIG. 2, according to an embodiment of the present disclosure, the electronic device managing system may include an electronic device 210, a business operator server 220, and a relay server 230. The business operator server 220 may include a mobile device management (MDM) server that remotely manages the electronic device 110.

The electronic device 210 may store data necessary for re-enrollment while or after performing enrollment for managing the electronic device, may read the stored data corresponding to any one of initialization of the electronic device 210 and deletion of a pre-stored management agent, may send a request for a management profile to the relay server 230 using the read data, and may receive at least one of a management agent installation file and information on the management profile received corresponding to the request. The electronic device 210 may send a request for information necessary for authentication to the relay server 230 using the read data and may receive at least one of the management agent installation file and information necessary for the authentication received corresponding to the request. The information necessary for the authentication may include the management profile. The electronic device 210 may install the management agent and may send a message to request enrollment or re-enrollment for management to the business operator server 220. The electronic device 210 may store the data before, while, or after performing the enrollment for management.

The relay server 230 may relay data communication between the electronic device 210 and the business operator server 220, determine the business operator server managing the electronic device 210, and transmit, to the electronic device 210, at least one of the management agent installation file and the information on the server of the determined business operator server.

When receiving the message to request enrollment or re-enrollment for management from the electronic device 210, the business operator server 220 may perform authentication on the electronic device 210 and may transmit data necessary for enrollment or re-enrollment to the electronic device 210. The business operator server 220 may perform at least one of blocking at least one function operated on the electronic device 210, installing at least one application on the electronic device 210, updating and deleting at least one installed application. The function may include various modules that may input and output data, such as wireless-fidelity (Wi-Fi), near field communication (NFC), a camera, Bluetooth, a recording function, or universal serial bus (USB). The application may include various applications that may input and output data. The business operator server 220 may send a request for enrollment to the electronic device 210, and the electronic device 210 receiving the request may delete or update pre-stored data and management agent under the control of the business operator server 220. The electronic device 210 may update information as to whether to reenroll the management agent under the control of the business operator server 220.

Figure 3:
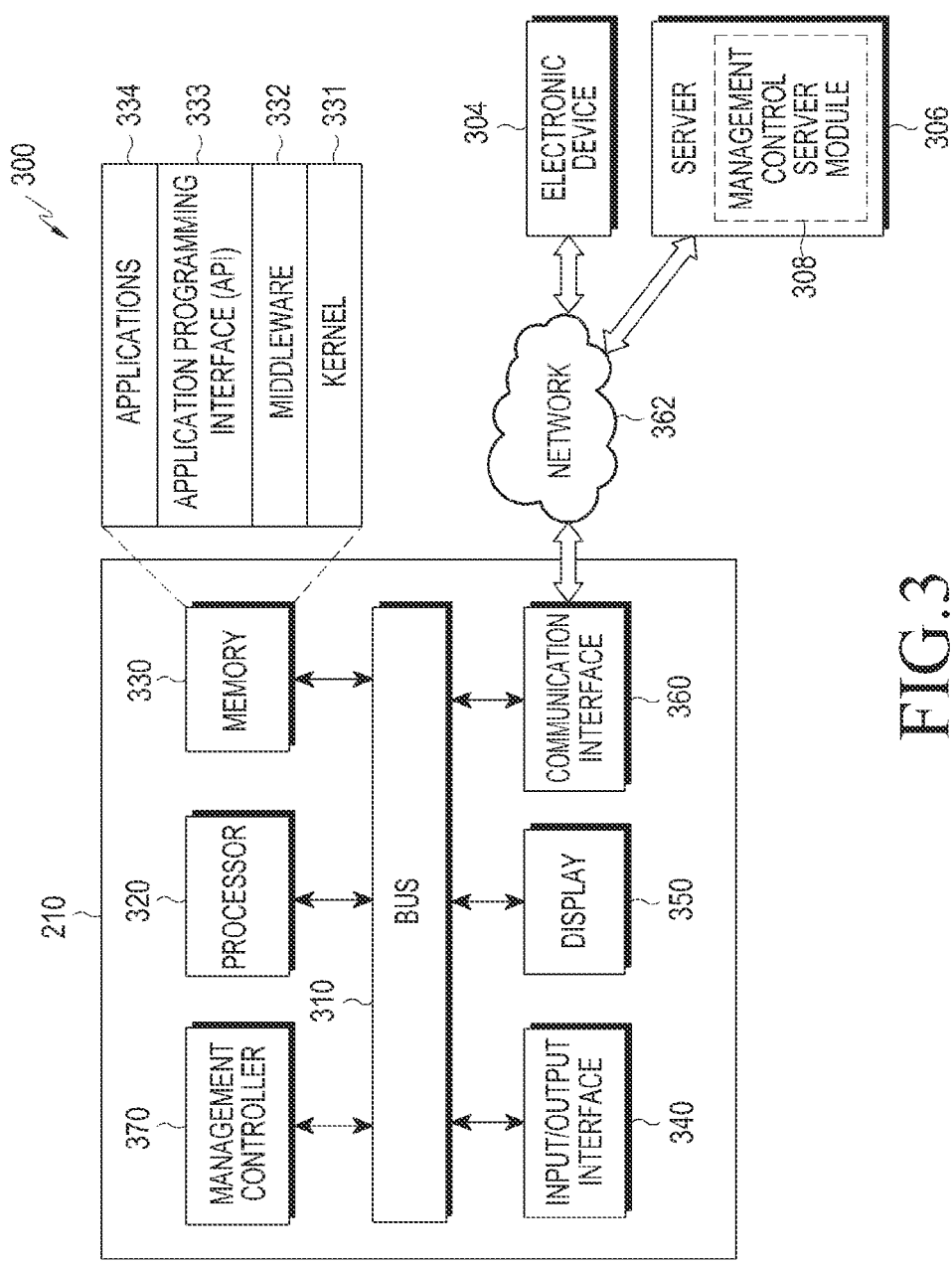
FIG. 3 illustrates a network environment including an electronic device according to an embodiment of the present disclosure.

FIG. 3 illustrates a network environment including an electronic device according to an embodiment of the present disclosure.

Referring to FIG. 3, the electronic device 210 may include a bus 310, a processor 320, a memory 330, an input/output interface 340, a display 350, a communication interface 370, and a management controller 370.

According to an embodiment of the present disclosure, the electronic device may include various electronic devices that may communicate data and may transmit or receive bio information to perform an operation. The electronic device may include a smartphone, a mobile phone, a laptop computer, a note personal computer (PC), a tablet PC, or a smart television (TV).

The bus 310 connects the other components to each other, and the bus 110 may carry communications (e.g., control messages) between the other components.

The processor 320 may receive a command from other component (e.g., the memory 330, the input/output interface 340, the display 350, the communication interface 360, or the management controller 370) through, e.g., the bus 310, may interpret the received command, and may execute computation or data processing according to the interpreted command.

The memory 330 may store a command or data received from other component (e.g., the input/output interface 340, the display 350, the communication interface 360, or the management controller 370) or a command or data generated by the processor 320 or other component. The memory 330 may retain programming modules including, e.g., a kernel 331, middleware 332, an application programming interface (API) 333, or an application 334. The programming modules may be configured in software, firmware, hardware or a combination of two or more thereof.

The kernel 331 may control or manage system resources (e.g., the bus 310, the processor 320, or the memory 330) used to execute the operation or function implemented in the other programming modules, e.g., the middleware 332, the API 333 or the application 334. The kernel 331 may provide an interface that allows the middleware 332, the API 333, or the application 334 to access the individual components of the electronic device 210 to control or manage the same.

The middleware 332 may function as a relay to allow the API 333 or the application 334 to communicate data with the kernel 331. A plurality of applications 334 may be provided. The middleware 332 may control work requests received from the applications 334, e.g., by allocation the priority of using the system resources of the electronic device 210 (e.g., the bus 310, the processor 320, or the memory 330) to at least one of the plurality of applications 334.

The API 333 is an interface allowing the application 334 to control functions provided from the kernel 331 or the middleware 332. For example, the API 333 may include at least one interface or function (e.g., a command) for filing control, window control, image processing or text control.

According to an embodiment of the present disclosure, there may be provided a plurality of applications 334 including a short message service (SMS)/multimedia messaging service (MMS) application, an email application, a calendar application, an alarm application, a health-care application (e.g., an application for measuring exercise amount or blood sugar), or an environmental information application (e.g., an application providing atmospheric pressure, moisture, or temperature information). Additionally or alternatively, the application 334 may be an application related to information exchange between the electronic device 210 and an external electronic device (e.g., electronic device 304). Examples of the information exchange-related application may include, but is not limited to, a notification relay application for transferring specific information to the external electronic device, or a device management application for managing the external electronic device.

For example, the notification relay application may include a function for relaying notification information generated from other applications of the electronic device 210 (e.g., the SMS/MMS application, email application, health-care application, or environmental information application) to the external electronic device (e.g., the electronic device 304). Additionally or optionally, the notification relay application may receive notification information from, e.g., the external electronic device (e.g., the electronic device 304) and may provide the received notification information to the user. The device management application may perform at least some functions of the external electronic device (e.g., the electronic device 304) communicating with the electronic device 304 (for example, turning on/off the external electronic device (or some components of the external electronic device) or control of brightness (or resolution) of the display), and the device management application may manage (e.g., install, delete, or update) an application operating in the external electronic device or a service (e.g., call service or message service) provided from the external electronic device.

According to an embodiment of the present disclosure, the application 334 may include an application designated depending on the attribute (e.g., type of electronic device) of the external electronic device (e.g., the electronic device 304). For example, in case the external electronic device is an MPEG audio layer-3 (MP3) player, the application 334 may include an application related to playing music. Similarly, in case the external electronic device is a mobile medical device, the application 334 may include an application related to health-care. According to an embodiment of the present disclosure, the application 334 may include an application designated to the electronic device 210 or an application received from an external electronic device (e.g., a server 306 or the electronic device 304).

The input/output interface 340 may transfer commands or data input by the user through an input/output device (e.g., a sensor, display, keyboard or touchscreen) to the processor 320, the memory 330, the communication interface 360, or the management controller 370 through, e.g., the bus 310. For example, the input/output interface 340 may provide data regarding the user's touch input through a touchscreen to the processor 320. The input/output interface 340 may output, through the input/output device (e.g., a speaker or display), commands or data received from the processor 320, the memory 330, the communication interface 360, or the management controller 370 through, e.g., the bus 310. For example, the input/output interface 340 may output voice data processed by the processor 320 to the user through a speaker.

The display 350 may display various types of information (e.g., multimedia data or text data) to the user.

The communication interface 360 may interface communication between the electronic device 210 and an external electronic device (e.g., the electronic device 304 or the server 306). For example, the communication interface 360 may be wiredly or wirelessly connected with the network 362 to communicate with the external electronic device. The wireless connection may be made by various radio communication protocols, including, but not limited to, wireless fidelity (Wi-Fi), Bluetooth (BT), near field communication (NFC), global positioning system (GPS), or cellular communication protocols (e.g., long term evolution (LTE), LTE-advanced (LTE-A), code division multiple access (CDMA), wideband CDMA (WCDMA), universal mobile telecommunications service (UMTS), wireless broadband (WiBro) or global system for mobile communications (GSM). The wired connection may be made by various wired communication protocols, including, but not limited to, universal serial bus (USB), high definition multimedia interface (HDMI), recommended standard 232 (RS-232), or plain old telephone service (POTS).

According to an embodiment of the present disclosure, the network 362 may be a telecommunication network. The telecommunication network may include a computer network, the Internet, an Internet of things (IoT) network, or a telephone network. According to an embodiment of the present disclosure, protocols for communication between the electronic device 210 and the external electronic device (examples of such protocols include, but are not limited to, transport layer protocol, data link layer protocol, or physical layer protocol) may be supported by the application 334, the API 333, the middleware 332, the kernel 331, or the communication interface 360.

The server 306 may support to drive the electronic device 210 by performing at least one operation of operations (or functions) implemented on the electronic device 210. For example, the server 306 may include a management control server module 308 that may support the management controller 370 implemented in the electronic device 210. For example, the management control server module 308 may include at least one element of the management controller 370 to perform (e.g., instead perform) at least one operation of operations performed by the management controller 370.

The management controller 370 may process at least part of information obtained from other elements (e.g., the processor 320, the memory 330, the input/output interface 340, or the communication interface 360) and may provide the same to the user in various manners. For example, the management controller 370 may control at least some functions of the electronic device 210 using the processor 320 or independently from the processor 320 so that the electronic device 210 may interwork with other electronic device (e.g., the electronic device 304 or the server 306). According to an embodiment of the present disclosure, at least one configuration of the management controller 370 may be included in the server 306 (e.g., the management control server module 308) and may be supported for at least one operation implemented on the management controller 370 from the server 306. Additional information on the management controller 370 is provided through FIGS. 4a to 9 that are described below.

Figure 4A:
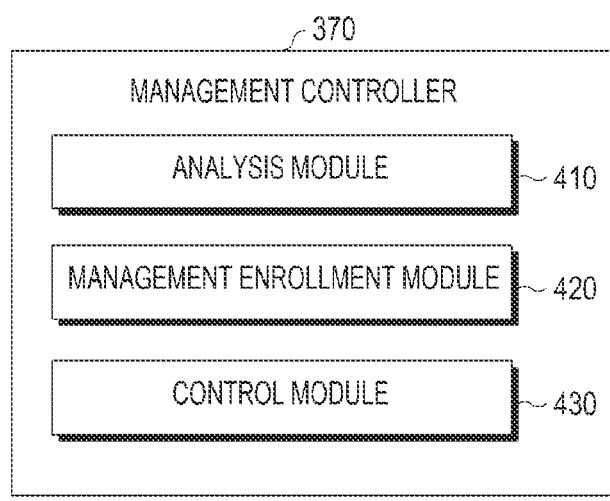
FIG. 4A is a block diagram illustrating a management controller of an electronic device according to an embodiment of the present disclosure.

FIG. 4a is a block diagram illustrating a management controller of an electronic device according to an embodiment of the present disclosure.

Referring to FIG. 4a, the management controller 370 may include an analysis module 410, a management enrollment module 420, and a control module 430. The management controller 370 may perform at least one function performed on at least one module of the analysis module 410, the management enrollment module 420, and the control module 430. The management controller 370 may be denoted as a controller.

According to an embodiment of the present disclosure, the management controller 370 may store data necessary for re-enrollment while or after performing enrollment for managing the electronic device 210, read the stored data corresponding to initialization of the electronic device 210, send a request for a management profile using the read data, receive at least one of a management agent installation file and information on the management profile received corresponding to the request, install the management agent, and send a message to request re-enrollment for management.

The management controller 370 may send a request for management enrollment to the business operator server 220 so that the electronic device 210 is managed by the company or organization to which the electronic device 210 belongs. The management controller 370 may store data necessary for re-enrollment that is to be generated while or after the management enrollment is performed. The data may be stored in a storage area that is not deleted or erased even when the electronic device 210 is initialized. The data may be stored in a file system area of the memory 330 in the electronic device 210. The data may be stored in an encrypted file system (EFS) area of the file system area. The data may include at least one of an identifier of the electronic device 210 and an identifier of the management profile. The identifier of the management profile may include an identifier of the management agent. The initialization may include at least one of booting and resenting the electronic device 210 and deleting the stored management agent. Further, the initialization may include initializing the electronic device 210 by an unlicensed user for illegal use of the electronic device 210. The management agent may be a mobile device management (MDM) agent that manages the electronic device 210.

The management controller 370 may send a request for a management profile to the relay server 230 using the read data, and corresponding to the request, the management controller 370 may receive at least one of a management agent installation file and information on the management profile from the relay server 230 and install the management agent using the received management agent installation file and information on the management profile. The relay server 230 may receive business operator server information from at least one business operator server and store the received business operator server information. When receiving a request for the management profile from the electronic device 210, the relay server 230 may do search as to whether there at least one business operator server information previously stored in the relay server 230 includes the corresponding business operator server information. When a request for management profile is made from the electronic device 210, the relay server 230 may determine the management agent as to which business operator the electronic device 210 belongs to. The relay server 230 may include a gateway server. The business operator server 220 may include an MDM server of an MDM vendor remotely managing the electronic device 210.

The management controller 370 may receive authentication information for installing the management agent and may compare the received authentication information with pre-stored authentication information. The management controller 370 may receive the authentication information from the user before or after installing the management agent or transmitting the management profile to the relay server 230. When the authentication information received after installation differs from the pre-stored authentication information, the installed management agent may be deleted. The pre-stored authentication information may be information for authenticating the original user of the electronic device 210, and such authentication information may be used to prevent illegal use of an intended user for various reasons, such as theft or loss. The management controller 370, when the received authentication information is not consistent with the pre-stored authentication information, may install the management agent. The management agent may perform at least one of installing, updating, and deleting at least one of at least one function and at least one application operated on the electronic device 210. The management agent may be an agent for remotely managing the user's electronic device by the company, group, or organization to which the user of the electronic device 210 belongs. The function may include various modules that may input and output data, such as wireless-fidelity (Wi-Fi), near field communication (NFC), a camera, Bluetooth, a recording function, or universal serial bus (USB). The application may include various applications that may input and output data.

The management controller 370 may install the management agent and may transmit, to a corresponding business operator server 220, a message to request re-enrollment for management. The management controller 370 may install the management agent provided from the business operator server 220 and may transmit a message to the business operator server 220 so that the electronic device 210 is controlled by the business operator server 220. The message may be a message for re-enrollment in the business operator server 220. The message may include various information allowing at least one function and at least one application operated on the electronic device 210 to be controlled by the business operator server 220. The message may include information allowing for at least one of installation, update, and deletion of at least one function and at least one application operated on the electronic device 210. Further, the message may include information for determining whether the electronic device 210 has previously performed enrollment in the business operator server 220. The function may include various modules that may input and output data, such as wireless-fidelity (Wi-Fi), near field communication (NFC), a camera, Bluetooth, a recording function, or universal serial bus (USB). The application may include various applications that may input and output data.

When receiving a message responding to the message to request re-enrollment, the management controller 370 may analyze the received response message to store data necessary for re-enrollment or update previously stored data. The data necessary for re-enrollment may be included in the response message or at least one of the information on the management profile and the management agent installation file transmitted from the relay server 230. When the electronic device 210 receives a message to request at least one of disenrollment, deletion of the pre-stored data, and deletion of the management agent from at least one of the relay server 230 and the business operator server 220, the management controller 370 may perform at least one of deleting the management agent and deleting the pre-stored data.

According to an embodiment of the present disclosure, the analysis module 410 may analyze whether the electronic device 210 is initialized and determine whether data necessary for re-enrollment is recorded in the memory 330. The analysis module 410 may analyze at least one of release of the re-enrollment, deletion of the data necessary for re-enrollment, and deletion of the management agent. The analysis module 410, when initialization proceeds, may analyze the necessity of installing the management agent. The analysis module 410, when initialization proceeds, may determine whether to reenroll the electronic device 210. The analysis module 410 may analyze at least one function and/or at least one application operated on the electronic device 210 to analyze the current version of each function and/or each application.

According to an embodiment of the present disclosure, the management enrollment module 420 may enroll or reenroll management in the business operator server 220 so that the electronic device 210 is controlled by the business operator server 220. The management enrollment module 420 may store data necessary for re-enrollment while performing enrollment for management of the electronic device 210, read the stored data corresponding to the initialization of the electronic device 210, and send a request for a management profile using the read data. The management enrollment module 420 may receive at least one of information on the management profile and a management agent installation file received corresponding to the request, install the management agent, and generate a message to request re-enrollment for management. The management enrollment module 420 may send a request for a management profile to the relay server 230 using the read data, and corresponding to the request, the management controller 370 may receive at least one of a management agent installation file and information on the management profile from the relay server 230 and install the management agent using the received management agent installation file and information on the management profile.

Upon reception of authentication information for installing the management agent through the input/output interface 340, the management enrollment module 420 may compare the received authentication information with pre-stored authentication information. The management enrollment module 420 may receive the authentication information from the user before or after installing the management agent or transmitting the management profile to the relay server 230. The management enrollment module 420, when the received authentication information is not consistent with the pre-stored authentication information, may install the management agent.

The management enrollment module 420 may install the management agent, generate a message to request re-enrollment for management, and transmit the generated message to the business operator server 220. The management enrollment module 420 may install the management agent provided from the business operator server 220 and may generate and transmit a message to the business operator server 220 so that the electronic device 210 is controlled by the business operator server 220. The message may be a message for re-enrollment in the business operator server 220. The message may include various information allowing at least one function and at least one application operated on the electronic device 210 to be controlled by the business operator server 220. The message may include information allowing for at least one of installation, update, and deletion of at least one function and at least one application operated on the electronic device 210. The function may include various modules that may input and output data, such as wireless-fidelity (Wi-Fi), near field communication (NFC), a camera, Bluetooth, a recording function, or universal serial bus (USB). The application may include various applications that may input and output data. When receiving a message responding to the message to request re-enrollment, the management enrollment module 420 may analyze the received response message to store data necessary for re-enrollment or update previously stored data. The data necessary for re-enrollment may be included in the response message or at least one of the information on the management profile and the management agent installation file transmitted from the relay server 230.

According to an embodiment of the present disclosure, the control module 430 may be a module controlling the management of the electronic device and may control at least one of installing, updating, and deleting at least one application or at least one function operated on the electronic device. The function may include various modules that may input and output data, such as wireless-fidelity (Wi-Fi), near field communication (NFC), a camera, Bluetooth, a recording function, or universal serial bus (USB). The application may include various applications that may input and output data. When the electronic device 210 receives a message to request at least one of disenrollment, deletion of the pre-stored data, and deletion of the management agent from at least one of the relay server 230 and the business operator server 220, the control module 430 may perform at least one of deleting the management agent and deleting the pre-stored data.

At least one of the functions respectively performed by the analysis module 410, the management enrollment module 420, and the control module 430 may be carried out by the management controller 370 or the processor 320.

Figure 4B:
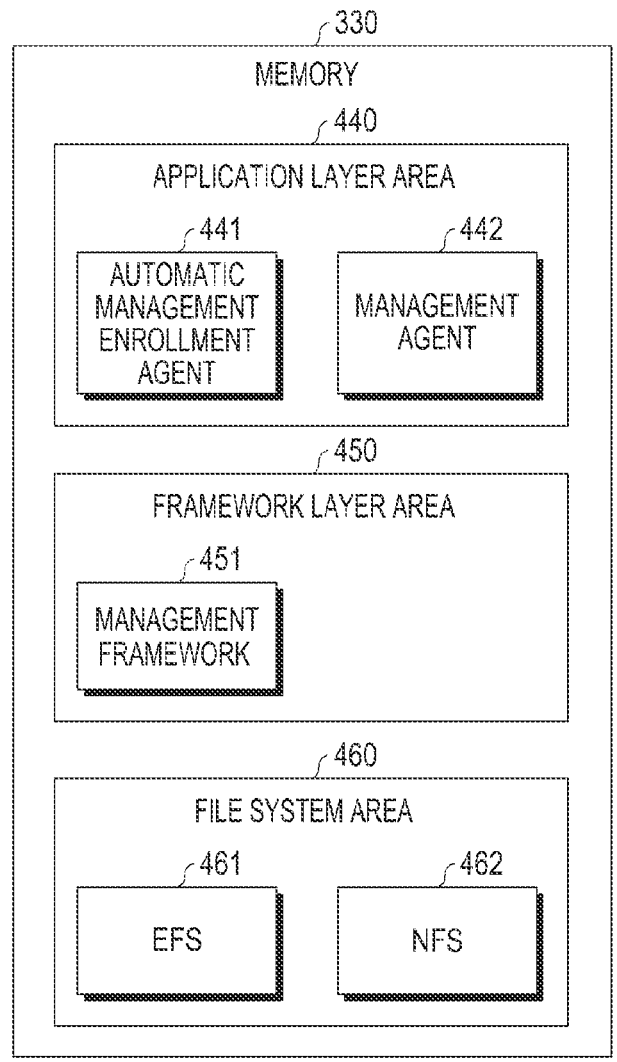
FIG. 4B is a block diagram illustrating a memory according to an embodiment of the present disclosure.

FIG. 4b is a block diagram illustrating a memory according to an embodiment of the present disclosure.

Referring to FIG. 4b, according to an embodiment of the present disclosure, the memory 330 may include an application layer area 440, a framework layer area 450, and a file system area 460.

The application layer area 440 may store an automatic management enrollment agent 441 and a management agent 442. The automatic management enrollment agent 441 may send a request for a management profile to the relay server 230 using at least one of an identifier of the electronic device 210 and an identifier of the management profile that are stored in the file system area 460 and may receive at least one of information on the management profile and a management agent installation file from the relay server 230. The identifier of the electronic device 210 is a unique identifier of the electronic device 210 registered in the business operator server 220. The identifier of the management profile may include a profile identifier of a management agent unique to the business operator. The automatic management enrollment agent 441 may check re-enrollment using at least one of the received information on the management profile and management agent installation file. The automatic management enrollment agent 441 may transmit a message to request re-enrollment to the business operator server 220. The automatic management enrollment agent 441, when receiving a response message corresponding to the message to request re-enrollment, may store data necessary for re-enrollment in the EFS 461 or may update data previously stored in the EFS 461. The automatic management enrollment agent 441 may send a request to a framework 451 so that at least one of the received information on the management profile and management agent installation file is stored. The management agent 442, when receiving a message to request the release of re-enrollment, may delete the pre-stored data.

The framework layer area 450 may store the management framework 451. The management framework 451 may store data necessary for enrollment or re-enrollment in the EFS 461 and may read pre-stored data. The management framework 451 may check whether the EFS 461 stores data necessary for enrollment/re-enrollment. Before checking whether the data is stored, the management framework 451 may determine whether re-enrollment has been previously performed. The management framework 451 may send a request as to whether enrollment or re-enrollment is required to the automatic management enrollment agent 441.

The file system area 460 may include an encrypted file system (EFS) 461 and a normal file system (NFS) 462. The EFS 461 is an area that is not deleted or erased even when the electronic device 210 is initialized and may store data necessary for enrollment/re-enrollment of the electronic device 210. The data stored in the EFS 461 should not be deleted or erased even when the electronic device 210 undergoes factory initialization.

The NFS 462 is an area that may be erased when the electronic device 210 is initialized. The NFS 462 may store data received from at least one of the relay server 230 and the business operator server 220 after the electronic device 210 is reenrolled. Further, the NFS 462 may store a management agent. The EFS 461 and the NFS 462 may be part of the memory 330 of the electronic device 210 and may be included in a single memory or in memories separate from each other.

Figure 5:
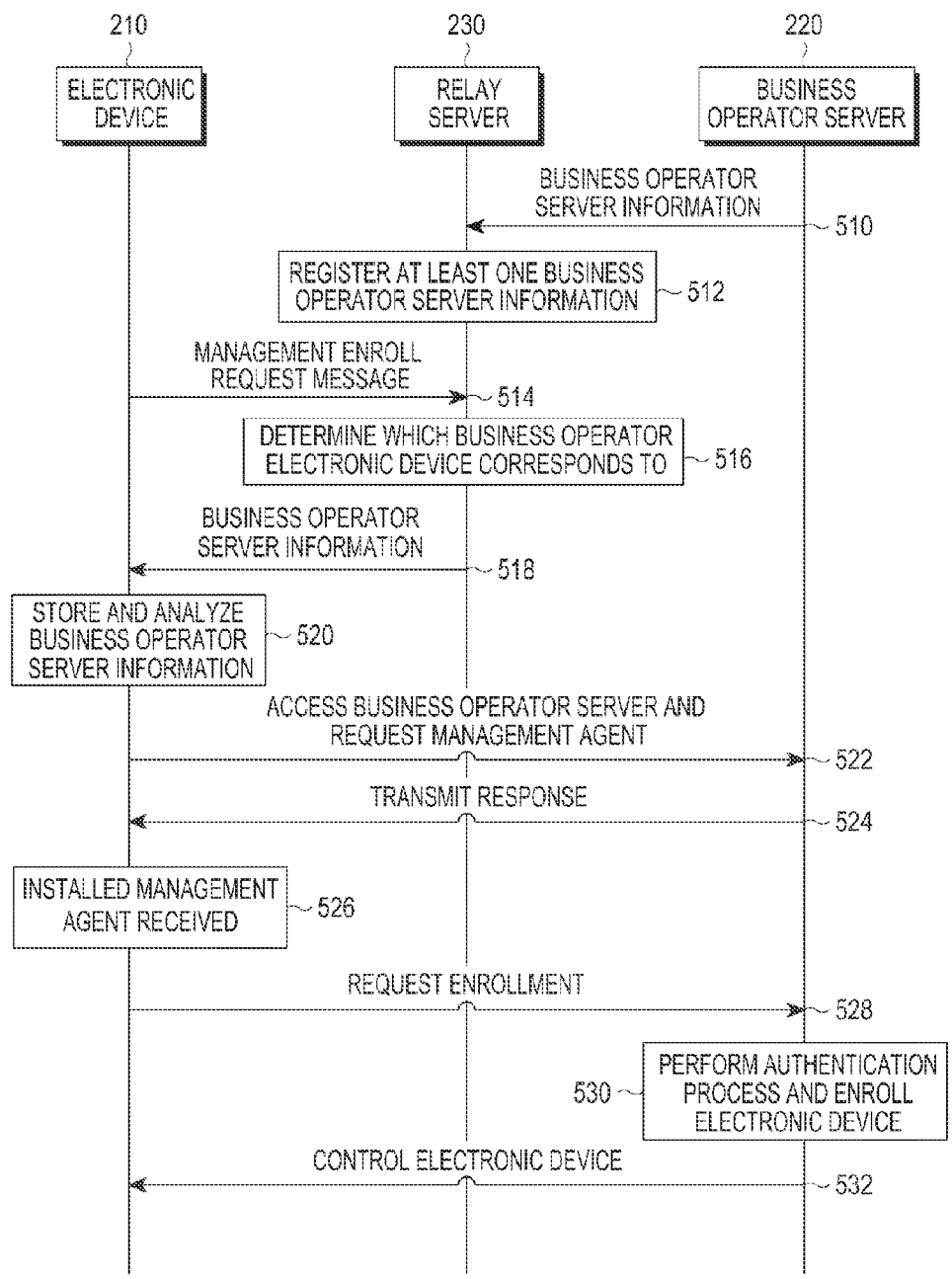
FIG. 5 is a flowchart illustrating a process of enrolling an electronic device according to an embodiment of the present disclosure.

FIG. 5 is a flowchart illustrating a process of enrolling an electronic device according to an embodiment of the present disclosure.

The process of enrolling an electronic device according to an embodiment of the present disclosure is now described in detail with reference to FIG. 5.

At least one business operator server 220 transmits its business operator server information to the relay server 230 (510). The business operator server 220 may be managed by a company, group, or organization and may send the business operator server information to the relay server 230 to be used for remotely controlling the electronic devices of employees or interested parties belonging to the company, group, or organization.

The relay server 230 may register business operator server information that may be the same or different from at least one business operator server (512). The relay server 230 may receive and store business operator server information that may be the same or different from at least one business operator server. The business operator server information may include identification information on at least one person belonging to the corresponding business operator. The business operator server information may include an identifier for at least one user or an identifier of at least one electronic device.

The electronic device 210 may transmit a management enroll request message to the relay server 230 (514). The electronic device 210 may transmit, to the relay server 230, a management enroll request message to request management of the business operator server 220. The electronic device 210 may generate the management enroll request message including at least one a user identifier and an electronic device identifier through an automatic management enrollment agent or previously stored and may send the generated management enroll request message to the relay server 230.

The relay server 230 may analyze the management enroll request message received from the electronic device 210 to determine which business operator the electronic device 210 belongs to (516). The relay server 230 may determine which business operator the electronic device 210 corresponds to through at least one of the user identifier and the electronic device identifier included in the received management enroll request message. The relay server 230 may receive each management enroll request message from at least one electronic device and may analyze which business operator each electronic device corresponds to by analyzing the received management enroll request message.

The relay server 230 may transmit business operator server information to the electronic device 210 in response to the management enroll request message (518). The relay server 230 may transmit business operator server information or an agent remotely managing the electronic device to the electronic device 210 in response to the management enroll request message. The relay server 230 may transmit corresponding business operator server information to each corresponding electronic device in response to each management enroll request message received from each electronic device.

The electronic device 210 may store and analyze the business operator server information received from the relay server 230 (520). The electronic device 210 may store the management agent of the business operator included in the business operator server information received from the relay server 230. The electronic device 210 may extract the profile identifier of the management agent of the business operator included in the business operator server information received from the relay server 230 and may store the extracted profile identifier in the EFS 461 of the memory 330. The electronic device 210 may store at least one of the identifier of the electronic device 210, the user identifier, and the profile identifier of the management agent in the EFS 461. At least one of the profile identifier of the management agent, the identifier of the electronic device 210, and the user identifier stored in the EFS 461 may be used to reenroll the electronic device 210 in the business operator server 220. The electronic device 210 may receive an agent remotely managing the electronic device from the relay server 230 and may install the received agent.

The electronic device 210 may access the corresponding business operator server through the received business operator server information and may send a request for a management agent (522). When the management agent is not stored, the electronic device 210 may access the corresponding business operator server through the received business operator server information and send a request for a management agent to the business operator server 220.

The business operator server 220 may transmit a response to an automatic management enrollment agent of the electronic device 210 (524). The business operator server 220, when receiving the request for management agent from the electronic device 210, may determine whether the electronic device 210 is a target managed by the business operator server 220, and if determined to be the target managed by the business operator server 220, may send a management agent to the electronic device 210.

The 210 may receive the management agent from the business operator server 220 and may install the received management agent (526). The electronic device 210 may store the received management agent in the application layer area 440 or NFS 462 of the memory 330. The electronic device 210 may receive authentication information from the user before installing the received management agent. The electronic device 210 may display, on the display 350, a popup window requesting to enter authentication information to determine whether the user currently carrying the electronic device 210 is the original user or an unauthenticated user that may have obtained the electronic device 210 from theft or loss before installing the received management agent. Further, the electronic device 210 may recognize the user through the authentication information by various methods, such as voice recognition or bio information recognition. When the authentication information is entered from the user, the electronic device 210 may compare the entered authentication information with pre-stored authentication information to determine whether the user having entered the authentication information is the original user. The pre-stored authentication information may include information previously entered by the original user to prevent illegal use by others.

The electronic device 210 may install the management agent and may send a request for enrollment to the business operator server 220 (528). The enrollment request is transmitted from the electronic device 210 to the business operator server 220 so that the electronic device 210 is controlled by the business operator server 220. The enrollment request may include at least one of an identifier of the electronic device 210, an identifier of the user, and an identifier of the management profile. The enrollment request may be for allowing the business operator server 220 to control at least one of installing, updating, and deleting at least one of at least one function and at least one application operated on the electronic device 210. The enrollment request may include information for performing at least one of installing, updating, and deleting at least one of at least one function and at least one application operated on the electronic device 210.

The business operator server 220, when receiving the enrollment request from the electronic device 210, may perform an authentication process through the identifier of the electronic device 210 included in the received enrollment request, and if the authentication is done, may enroll the electronic device 210 (530). The business operator server 220 may store or update information on at least one function and at least one application operated on the electronic device 210. The business operator server 220 may determine various functions provided from the electronic device 210 through the enrollment process and may determine what applications have been installed. The business operator server 220 may perform at least one of installing, updating, and deleting at least one application and/or at least one function among such various functions and applications. The business operator server 220 may remotely control at least one application installed on the electronic device 210 and/or at least one function operated on the electronic device 210. The business operator server 220 may block or disable at least one of various functions operated on the electronic device 210 and may perform at least one of installing, updating, and deleting at least one of various applications. The function may include various modules that may input and output data, such as wireless-fidelity (Wi-Fi), near field communication (NFC), a camera, Bluetooth, a recording function, or universal serial bus (USB). The application may include various applications that may input and output data.

Figure 6:
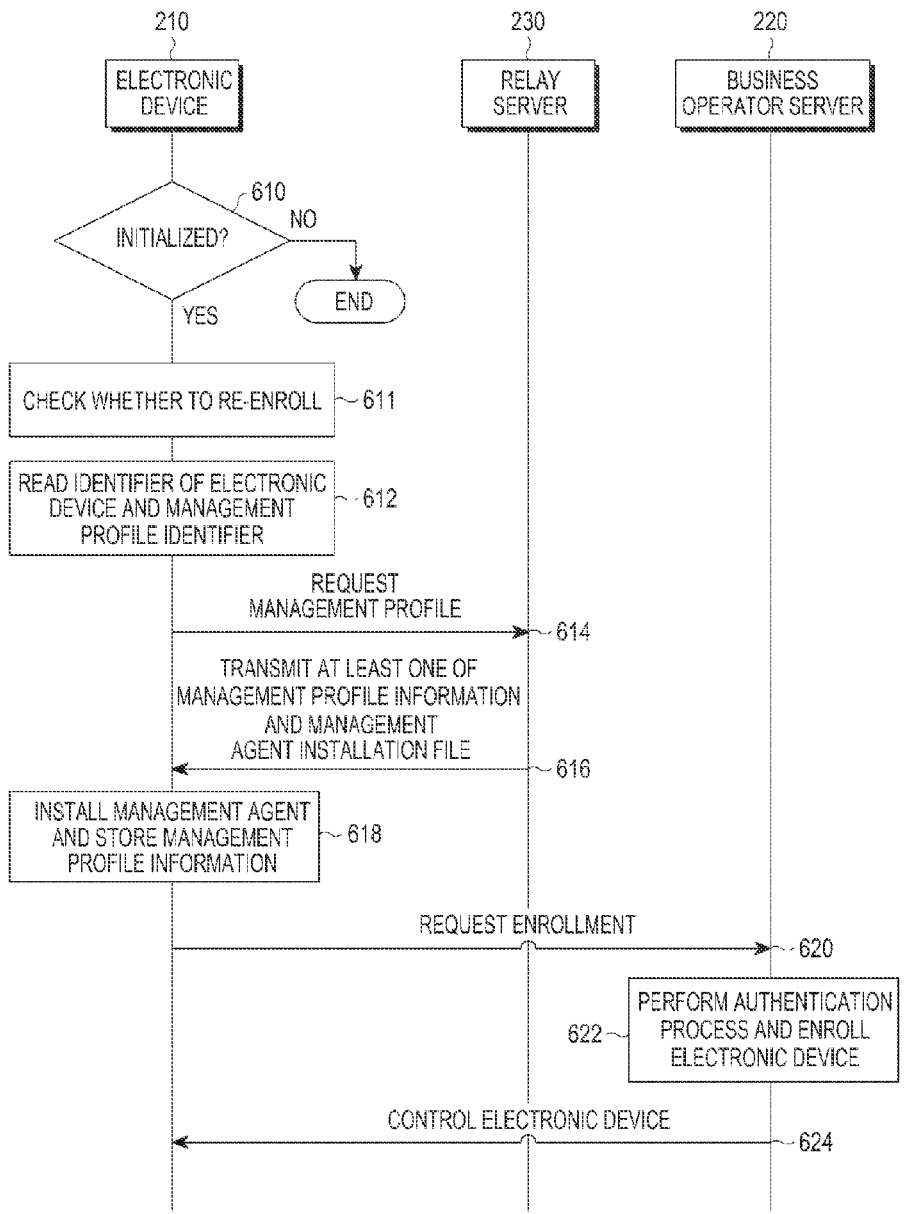
FIG. 6 is a flowchart illustrating a process of reenrolling an electronic device according to an embodiment of the present disclosure.

FIG. 6 is a flowchart illustrating a process of reenrolling an electronic device according to an embodiment of the present disclosure.

The process of reenrolling an electronic device according to an embodiment of the present disclosure is now described in detail with reference to FIG. 6.

When the electronic device 210 is initialized (610), the electronic device 210 may check whether to proceed with re-enrollment (611). The electronic device 210 may determine the initialization, and if the initialization is done, may determine whether to proceed with re-enrollment or not. Further, the electronic device 210 may check re-enrollment progress option data. The electronic device 210 may determine whether to proceed with re-enrollment or not by checking the re-enrollment progress option data.

When re-enrollment proceeds, the electronic device 210 may read its identifier and an identifier of the management profile (612). The electronic device 210 may determine whether the electronic device 210 is initialized. The initialization may include at least one of booting and resenting the electronic device 210 and deleting the stored management agent. Further, the initialization may include initializing the electronic device 210 by an unlicensed user for illegal use of the electronic device 210. The electronic device 210 may store at least one of the identifier of the electronic device 210, the profile identifier of the management agent, and the user identifier in the EFS 461 of the memory 330. At least one of the profile identifier of the management agent, the identifier of the electronic device 210, and the user identifier stored in the EFS 461 may be used to reenroll the electronic device 210 in the business operator server 220. The identifier of the electronic device 210 may be a unique identifier of the electronic device 210 registered in the business operator server 220. The identifier of the management profile may include a profile identifier of a management agent unique to the business operator.

The electronic device 210 may send a request for a management profile to the relay server 230 (614). The electronic device 210 may send a request for the management profile of the management agent managed by the business operator server in order to manage the business operator server 220. The electronic device 210 may generate a message to request the management profile including at least one the user identifier, electronic device identifier, and management profile identifier previously stored and may transmit the generated message to the relay server 230.

The relay server 230 may transmit at least one of management profile information and a management agent installation file to the electronic device 210 in response to the request (616). The relay server 230 may analyze the request received from the electronic device 210 to determine which business operator the electronic device 210 corresponds to and may determine which business operator the electronic device 210 corresponds to through at least one of the user identifier, electronic device identifier, and management profile identifier. The relay server 230 may receive each management enroll request message from at least one electronic device and may analyze which business operator each electronic device corresponds to by analyzing the received management enroll request message. The relay server 230 may transmit at least one of management profile information and a management agent installation file to the electronic device 210. The relay server 230 may transmit business operator server information or an agent remotely managing the electronic device to the electronic device 210 in response to the request. The relay server 230 may transmit corresponding business operator server information to each corresponding electronic device in response to each request received from each electronic device.

The electronic device 210 may receive at least one of the management profile information and the management agent installation file from the relay server 230 and may store at least one of the received management profile information and management agent installation file (618). The electronic device 210 may install the received management agent. The electronic device 210 may receive information on the business operator server 220 from the relay server 230. The electronic device 210 may receive the profile identifier of the management agent from the relay server 230 and may store the received profile identifier of the management agent. The electronic device 210 may store the received management profile identifier in the EFS 461 of the memory 330 or may update the received management profile identifier. At least one of the profile identifier of the management agent, the identifier of the electronic device 210, and the user identifier stored in the EFS 461 may be used to reenroll the electronic device 210 in the business operator server 220. The electronic device 210 may receive an agent remotely managing the electronic device from the relay server 230 and may install the received agent. The electronic device 210 may install the management agent through the received management agent installation file. The electronic device 210 may receive authentication information from the user before installing the received management agent. The electronic device 210 may display, on the display 350, a popup window requesting to enter authentication information to determine whether the user currently carrying the electronic device 210 is the original user or an unauthenticated user that may have obtained the electronic device 210 from theft or loss before installing the received management agent. Further, the electronic device 210 may recognize the user through the authentication information by various methods, such as voice recognition or bio information recognition. When the authentication information is entered from the user, the electronic device 210 may compare the entered authentication information with pre-stored authentication information to determine whether the user having entered the authentication information is the original user. The pre-stored authentication information may include information previously entered by the original user to prevent illegal use by others.

The electronic device 210 may install the management agent and may send a request for enrollment to the business operator server 220 (620). The enrollment request may be transmitted from the electronic device 210 to the business operator server 220 so that the electronic device 210 is controlled by the business operator server 220. The enrollment request may include at least one of an identifier of the electronic device 210, an identifier of the user, and an identifier of the management profile. The enrollment request is for allowing the business operator server 220 to control at least one of installing, updating, and deleting at least one of at least one function and at least one application operated on the electronic device 210. The enrollment request may include information for performing at least one of installing, updating, and deleting at least one of at least one function and at least one application operated on the electronic device 210. The electronic device 210 may receive a result for the enrollment request. The electronic device 210 may determine that initialization is performed in the process 610 and may receive a result of the re-enrollment in the process 722 to be controlled by a default management policy until before the re-enrollment is completed. Since the electronic device 210 needs to be managed until before the re-enrollment is done, the electronic device 210 may be controlled by a preset default management policy. For example, since a captured image or data may be transmitted to the outside through at least one function of capturing an image or communicating data, such as a camera function, USB function, NFC function, or Wi-Fi function of the electronic device 210, such at least one function may be controlled by the preset default management policy before the re-enrollment is complete, and when the re-enrollment is complete, the at least one function may be released and controlled by the business operator server where the re-enrollment has been made.

The business operator server 220, when receiving the enrollment request from the electronic device 210, may perform an authentication process through the identifier of the electronic device 210 included in the received enrollment request, and if the authentication is done, may enroll the electronic device 210 (622). The business operator server 220 may store or update information on at least one function and at least one application operated on the electronic device 210. The business operator server 220 may determine various functions provided from the electronic device 210 through the enrollment process and may determine what applications have been installed.

The business operator server 220 may control the electronic device 210 (624). The business operator server 220 may remotely control at least one application installed on the electronic device 210 and/or at least one function operated on the electronic device 210. The business operator server 220 may block or disable at least one of various functions operated on the electronic device 210 and may perform at least one of installing, updating, and deleting at least one of various applications.

Figure 7:
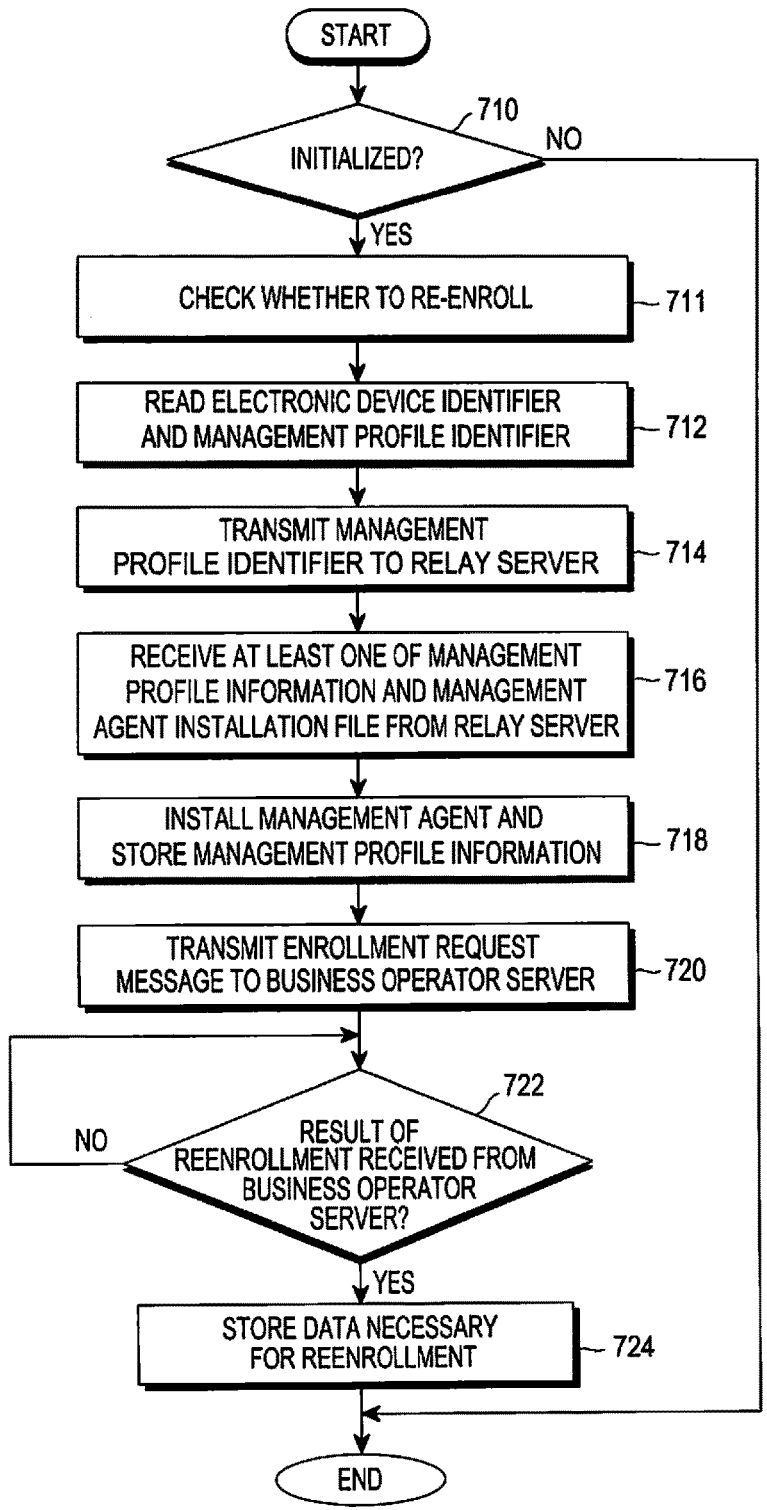
FIG. 7 is a flowchart illustrating a process of reenrolling an electronic device according to an embodiment of the present disclosure.

FIG. 7 is a flowchart illustrating a process of reenrolling an electronic device according to an embodiment of the present disclosure.

When the electronic device 210 is initialized (710), the electronic device 210 may check whether to proceed with re-enrollment (711). The electronic device 210 may determine the initialization, and if the initialization is done, may determine whether to proceed with re-enrollment or not. Further, the electronic device 210 may check re-enrollment progress option data. The electronic device 210 may determine whether to proceed with re-enrollment or not by checking the re-enrollment progress option data.

When re-enrollment proceeds, the electronic device 210 may read its identifier and an identifier of the management profile (712). The electronic device 210 may determine whether the electronic device 210 is initialized. The initialization may include at least one of booting and resenting the electronic device 210 and deleting the stored management agent. Further, the initialization may include initializing the electronic device 210 by an unlicensed user for illegal use of the electronic device 210. The electronic device 210 may store at least one of the identifier of the electronic device 210, the profile identifier of the management agent, and the user identifier in the EFS 461 of the memory 330. At least one of the profile identifier of the management agent, the identifier of the electronic device 210, and the user identifier stored in the EFS 461 may be used to reenroll the electronic device 210 in the business operator server 220. The identifier of the electronic device 210 is a unique identifier of the electronic device 210 registered in the business operator server 220. The identifier of the management profile may include a profile identifier of a management agent unique to the business operator.

The electronic device 210 may transmit a management profile identifier to the relay server 230 (714). The electronic device 210 may send a request for a management agent managed by the business operator server in order to manage the business operator server 220. The electronic device 210 may transmit a management profile identifier to the relay server 230 to request the management agent. The electronic device 210 may generate a message to request the management agent including at least one the user identifier, electronic device identifier, and management profile identifier previously stored and may transmit the generated message to the relay server 230.

The electronic device 210 may receive at least one of management profile information and a management agent installation file from the relay server 230 in response to the request (716). The relay server 230 may analyze the request received from the electronic device 210 to determine which business operator the electronic device 210 corresponds to and may determine which business operator the electronic device 210 corresponds to through at least one of the user identifier, electronic device identifier, and management profile identifier. The relay server 230 may receive each management enroll request message from at least one electronic device and may analyze which business operator each electronic device corresponds to by analyzing the received management enroll request message. The electronic device 210 may receive at least one of management profile information and a management agent installation file from the relay server 230. The electronic device 210 may receive an agent remotely managing the electronic device or business operator server information from the relay server 230 in response to the request.

The electronic device 210 may receive at least one of the management profile information and management agent installation file from the relay server 230, store the received management profile information, and install the management agent (718). The electronic device 210 may install the received management agent. The electronic device 210 may receive information on the business operator server 220 from the relay server 230. The electronic device 210 may receive the profile identifier of the management agent from the relay server 230 and may store the received profile identifier of the management agent. The electronic device 210 may store the received management profile identifier in the EFS 461 of the memory 330 or may update the received management profile identifier. The electronic device 210 may receive a management agent remotely managing the electronic device from the relay server 230 and may install the received management agent. The electronic device 210 may install the management agent through the received management agent installation file. The electronic device 210 may receive authentication information from the user before installing the received management agent. The electronic device 210 may display, on the display 350, a popup window requesting to enter authentication information to determine whether the user currently carrying the electronic device 210 is the original user or an unauthenticated user that may have obtained the electronic device 210 from theft or loss before installing the received management agent. Further, the electronic device 210 may recognize the user through the authentication information by various methods, such as voice recognition or bio information recognition. When the authentication information is entered from the user, the electronic device 210 may compare the entered authentication information with pre-stored authentication information to determine whether the user having entered the authentication information is the original user. The pre-stored authentication information may include information previously entered by the original user to prevent illegal use by others.

The electronic device 210 may install the management agent and may transmit an enrollment request message to the business operator server 220 (720). The enrollment request message may be transmitted from the electronic device 210 to the business operator server 220 so that the electronic device 210 is controlled by the business operator server 220. The enrollment request may include at least one of an identifier of the electronic device 210, an identifier of the user, and an identifier of the management profile. The enrollment request is for allowing the business operator server 220 to control at least one of installing, updating, and deleting at least one of at least one function and at least one application operated on the electronic device 210. The enrollment request may include information for performing at least one of installing, updating, and deleting at least one of at least one function and at least one application operated on the electronic device 210.

When receiving a result of the re-enrollment from the business operator server (722), the electronic device 210 may store data necessary for re-enrollment (724). The electronic device 210 may determine that initialization is performed in the process 710 and may receive a result of the re-enrollment in the process 722 to be controlled by a default management policy until before the re-enrollment is completed. Since the electronic device 210 needs to be managed until before the re-enrollment is done, the electronic device 210 may be controlled by a preset default management policy. For example, since a captured image or data may be transmitted to the outside through at least one function of capturing an image or communicating data, such as a camera function, USB function, NFC function, or Wi-Fi function of the electronic device 210, such at least one function may be controlled by the preset default management policy before the re-enrollment is complete, and when the re-enrollment is complete, the at least one function may be released and controlled by the business operator server where the re-enrollment has been made. The default management policy may be set by the business operator managing the business operator server 220. The business operator server 220, when receiving the enrollment request from the electronic device 210, may perform an authentication process through the identifier of the electronic device 210 included in the received enrollment request, and if the authentication is done, may reenroll the electronic device 210. The business operator server 220 may transmit a result of the re-enrollment to the electronic device 210. When receiving the result of the re-enrollment, the electronic device 210 may store data necessary for re-enrollment. The data may include at least one of the identifier of the electronic device 210, user identifier, and profile identifier of the management agent. When receiving the result of the re-enrollment, the electronic device 210 may update data necessary for re-enrollment. The electronic device 210 may be controlled by the business operator server 220. At least one function operated on the electronic device 210 and/or at least one application installed on the electronic device 210 may be remotely controlled by the business operator server 220. At least one of various functions operated on the electronic device 210 may be remotely blocked or disabled by the business operator server 220, and at least one of various applications may perform at least one of installation, update, and deletion. The function may include various modules that may input and output data, such as wireless-fidelity (Wi-Fi), near field communication (NFC), a camera, Bluetooth, a recording function, or universal serial bus (USB). The present disclosure may include various functions executable on the electronic device 210 in addition to the above-described functions. The application may include various applications that may input and output data. The business operator server 220 may send a request for enrollment to the electronic device 210, and the electronic device 210 receiving the request may delete pre-stored data and management agent under the control of the business operator server 220.

Figure 8:
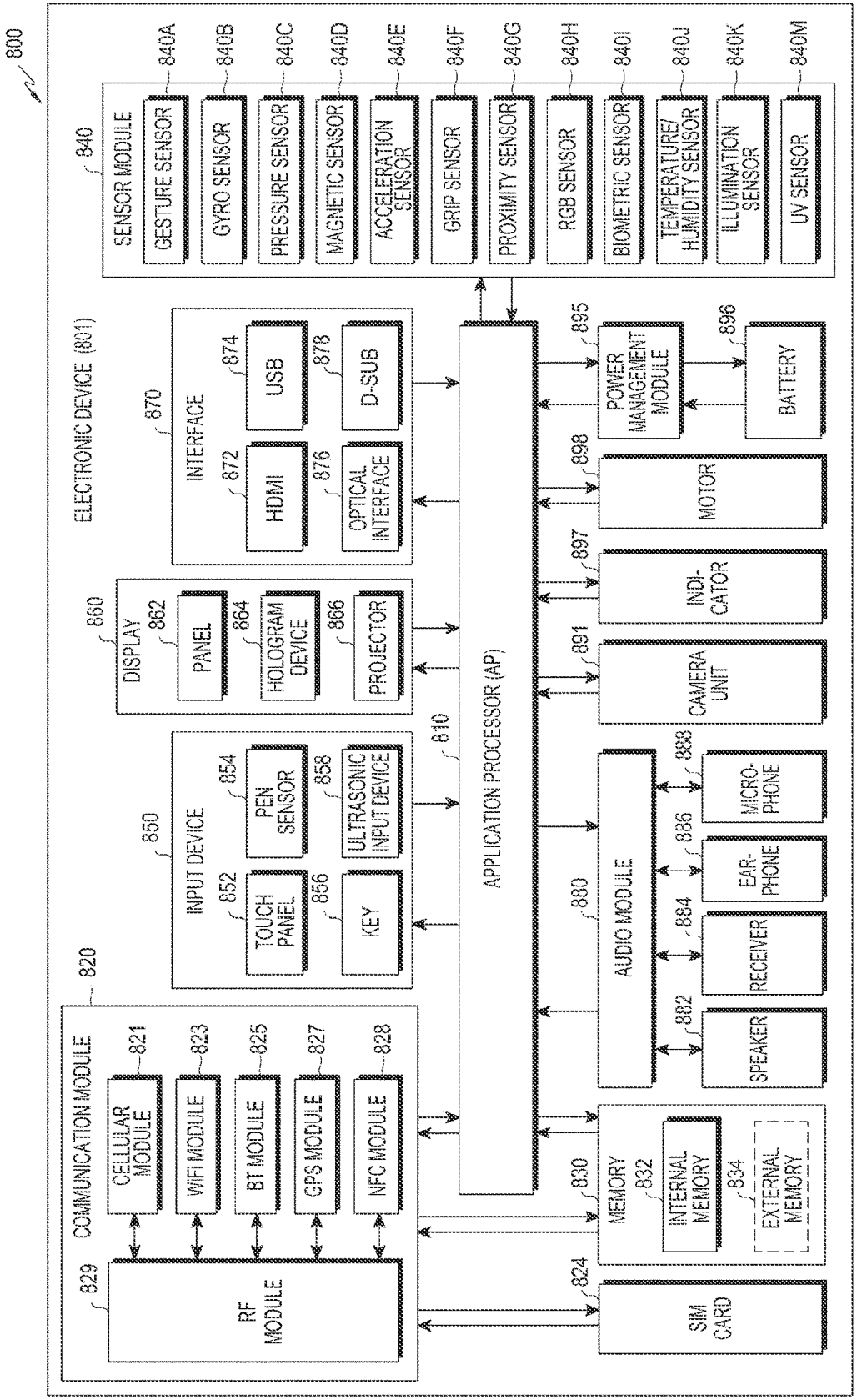
FIG. 8 is a block diagram illustrating an electronic device according to an embodiment of the present disclosure.

FIG. 8 is a block diagram illustrating an electronic device according to an embodiment of the present disclosure.

The electronic device may include the whole or part of the configuration of, e.g., the electronic device 210 shown in FIG. 3. Referring to FIG. 8, the electronic device 801 may include one or more application processors (APs) 810, a communication unit 820, a subscriber identification module (SIM) card 824, a memory 830, a sensor unit 840, an input device 850, a display 860, an interface 870, an audio unit 880, a camera unit 891, a power management unit 895, a battery 896, an indicator 897, and a motor 898.

The AP 810 may control multiple hardware and software components connected to the AP 810 by running an operating system or application programs, and the AP 2010 may process and compute various data including multimedia data. The AP 810 may be implemented in, e.g., a system on chip (SoC). According to an embodiment of the present disclosure, the AP 810 may further include a graphic processing unit (GPU) (not shown).

The communication unit 820 (e.g. the communication interface 160) may perform data communication with other electronic devices (e.g., the electronic device 104 or server 106) connected with the electronic device 801 (e.g., the electronic device 210) via a network. According to an embodiment of the present disclosure, the communication unit 820 may include a cellular module 821, a Wi-Fi module 823, a BT module 825, a GPS module 827, an NFC module 828, and a radio frequency (RF) module 829.

The cellular module 821 may provide voice call, video call, text, or Internet services through a communication network (e.g., an LTE, LTE-A, CDMA, WCDMA, UMTS, WiBro, or GSM network). The cellular module 821 may perform identification and authentication on the electronic device in the communication network using, e.g., a subscriber identification module (e.g., the SIM card 824). According to an embodiment of the present disclosure, the cellular module 821 may perform at least some of the functions providable by the AP 810. For example, the cellular module 821 may perform at least some of the multimedia control functions.

According to an embodiment of the present disclosure, the cellular module 821 may include a communication processor (CP). The cellular module 821 may be implemented in, e.g., an SoC. Although in FIG. 8 the cellular module 821 (e.g., a communication processor), the memory 830, or the power management unit 895 are provided separately from the AP 810, the AP 810 may be configured to include at least some (e.g., the cellular module 821) of the above-listed components, according to an embodiment of the present disclosure.

According to an embodiment of the present disclosure, the AP 810 or the cellular module 821 (e.g., a communication processor) may load commands or data received from a non-volatile memory or other component connected thereto and process the loaded commands or data. The AP 810 or the cellular module 821 may store, in the non-volatile memory, data received from other component(s) or data generated by the other component(s).

The Wi-Fi module 823, the BT module 825, the GPS module 827, or the NFC module 828 may include a process for, e.g., processing data communicated through the module. Although in FIG. 8 the cellular module 821, the Wi-Fi module 823, the BT module 825, the GPS module 827, and the NFC module 828 are shown in their respective separate blocks, at least some (e.g., two or more) of the cellular module 821, the Wi-Fi module 823, the BT module 825, the GPS module 827, and the NFC module 828 may be included in a single integrated circuit (IC) or an IC package. For example, at least some of the processors respectively corresponding to the cellular module 821, the Wi-Fi module 823, the BT module 825, the GPS module 827, and the NFC module 828 (e.g., the communication processor corresponding to the cellular module 821 and the Wi-Fi processor corresponding to the Wi-Fi module 823) may be implemented in a single SoC.

The RF module 829 may communicate data, e.g., radio frequency (RF) signals. Although not shown, the RF module 829 may include, e.g., a transceiver, a power amp module (PAM), a frequency filter, or a low noise amplifier (LNA). The RF module 829 may further include parts (e.g., conductors or wires) for communicating radio waves in a free space upon performing wireless communication. Although in FIG. 8 the cellular module 821, the Wi-Fi module 823, the BT module 825, the GPS module 827, and the NFC module 828 share a single RF module 829, the cellular module 821, the Wi-Fi module 823, the BT module 825, the GPS module 827, or the NFC module 828 may communicate RF signals through a separate RF module(s).

The SIM card 824 may include a subscriber identification module, and the SIM card 2024 may be inserted into a slot formed at a predetermined position of the electronic device. The SIM card 824 may contain unique identification information (e.g., an integrated circuit card identifier (ICCID) or subscriber information (e.g., an international mobile subscriber identity (IMSI)).

The memory 830 (e.g., the memory 330) may include an internal memory 832 or an external memory 834. The internal memory 832 may include, e.g., a volatile memory (e.g., a dynamic RAM (DRAM), a static RAM (SRAM), a synchronous dynamic RAM (SDRAM), etc.) or a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a NAND flash memory, or a NOR flash memory).

According to an embodiment of the present disclosure, the internal memory 832 may be a solid state drive (SSD). The external memory 834 may include a flash drive, e.g., a compact flash (CF) memory, a secure digital (SD) memory, a micro-SD memory, a min-SD memory, an extreme digital (xD) memory, or a memory stick™. The external memory 834 may be functionally connected with the electronic device 801 via various interfaces. According to an embodiment of the present disclosure, the electronic device 801 may further include a storage device (or storage medium) such as a hard disk drive.

The sensor module 840 may measure a physical quantity or detect an operational stage of the electronic device 801, and the sensor unit 840 may convert the measured or detected information into an electrical signal. The sensor unit 840 may include at least one of, e.g., a gesture sensor 840A, a gyro sensor 840B, an air pressure sensor 840C, a magnetic sensor 840D, an acceleration sensor 840E, a grip sensor 840F, a proximity sensor 840G, a color sensor 840H such as an red-green-blue (RGB) sensor, a bio sensor 840I, a temperature/humidity sensor 840J, an illumination sensor 840K, or an ultra violet (UV) sensor 840M. Additionally or alternatively, the sensor unit 840 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor which is not shown in the drawings. The sensor unit 840 may include at least one sensor that may sense or recognize bio information, such as a hand or foot fingerprint, iris, face, heartbeat rate, brainwave, joint, or pulse. Further, the sensor module 840 may include various sensors that may sense the user's respiration in addition to the above-described multiple sensors. The sensor module 840 may further include a control circuit for controlling at least one or more of the sensors included therein.

The input unit 850 may include a touch panel 852, a (digital) pen sensor 854, a key 856, or an ultrasonic input device 858. The touch panel 852 may recognize touch inputs in at least one of capacitive, resistive, infrared, or ultrasonic methods. The touch panel 852 may further include a control circuit. With the capacitive method, physical contact or proximity detection may be possible. The touch panel 852 may further include a tactile layer. In this regard, the touch panel 852 may provide the user with a tactile response.

The (digital) pen sensor 854 may be implemented in a way identical or similar to e.g., how a touch input of a user is received, or by using a separate sheet for recognition. The key 856 may include e.g., a physical button, optical key or key pad. The ultrasonic input device 858 may use an input tool that generates an ultrasonic signal and enable the electronic device 801 to determine data by sensing the ultrasonic signal to the microphone 888, thereby enabling wireless recognition. According to an embodiment of the present disclosure, the electronic device 801 may receive the user's input from an external electronic device (e.g., a network, computer, or server) connected with the electronic device 801 using the communication unit 820.

The display 860 (e.g., the display 150) may include a panel 862, a hologram device 864, or a projector 866. The panel 862 may be, e.g., a liquid crystal display (LCD), active matrix organic light emitting diodes (AMOLEDs), or the like. The panel 862 may be implemented to be flexible, transparent, or wearable. The panel 862 may also be incorporated with the touch panel 852 in a module. The hologram device 864 may make three dimensional (3D) images (holograms) in the air by using light interference. The projector 866 may display an image by projecting light onto a screen. The screen may be, for example, located inside or outside of the electronic device 801. In accordance with an embodiment, the display 860 may further include a control circuit to control the panel 862, the hologram device 864, or the projector 866.

The interface 870 may include e.g., a High Definition Multimedia Interface (HDMI) 872, a USB 874, an optical interface 876, or a D-subminiature (D-sub) 878. The interface 870 may be included in e.g., the communication interface 160 shown in FIG. 3. Additionally or alternatively, the interface 870 may include a Mobile High-definition Link (MHL) interface, a secure digital (SD) card/multimedia card (MMC) interface, or IrDA standard interface.

The audio unit 880 may perform various processes (e.g., encoding or decoding) relating to converting a sound wave and audio signal to an electric signal or vice versa. At least a part of the audio unit 880 may be included in e.g., the input/output interface 140 as shown in FIG. 3. The audio unit 880 may process sound information input or output through e.g., a speaker 882, a receiver 884, an earphone 886, or a microphone 888.

The camera module 891 may be a device for capturing still images and videos, and may include, according to an embodiment of the present disclosure, one or more image sensors (e.g., front and back sensors) (not shown), a lens (not shown), an Image Signal Processor (ISP) (not shown), or a flash such as a light emitting diode (LED) or xenon lamp (not shown).

The power manager unit 895 may manage power of the electronic device 801. Although not shown, the power management unit 895 may include, e.g., a power management integrated circuit (PMIC), a charger IC, or a battery or fuel gauge.

The PMIC may be mounted on e.g., an IC or an SOC. A charging method may be divided into wired and wireless charging methods. The charger IC may charge a battery and prevent overvoltage or overcurrent from being induced from a charger. According to an embodiment of the present disclosure, the charger IC may be used in at least one of a cable charging scheme and a wireless charging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging.

The battery gauge may measure an amount of remaining power of the battery 896, a voltage, a current, or a temperature while the battery 2096 is being charged. The battery 896 may save or generate electricity, and supply power to the electronic device 801 with the saved or generated electricity. The battery 896 may include, e.g., a rechargeable battery or a solar battery.

The indicator 897 may indicate a particular state of the electronic device 801 or a part of the electronic device (e.g., the AP 810), including e.g., a booting state, a message state, or recharging state. The motor 898 may convert an electric signal to a mechanical vibration. Although not shown, a processing unit for supporting mobile TV, such as a GPU may be included in the electronic device 801. The processing unit for supporting mobile TV may process media data conforming to a standard for digital multimedia broadcasting (DMB), digital video broadcasting (DVB), or media flow.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

Figure 9:
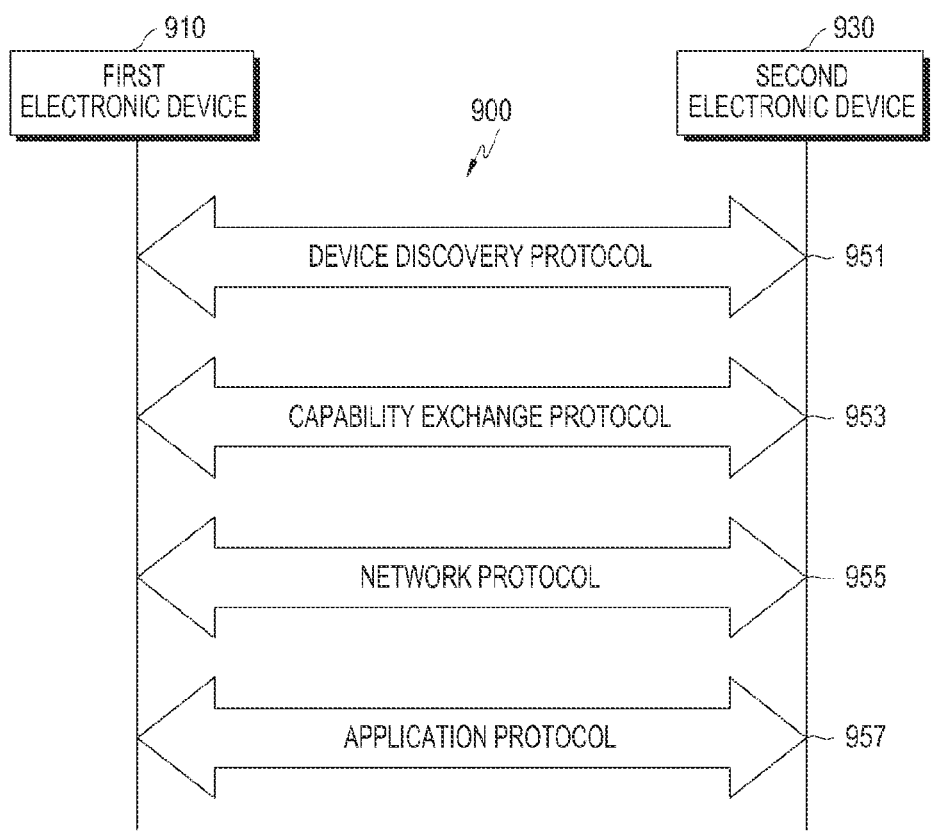
FIG. 9 illustrates a communication protocol between a plurality of electronic devices according to an embodiment of the present disclosure.

FIG. 9 illustrates a communication protocol 900 between a plurality of electronic devices (e.g., a first electronic device 910 and a second electronic device 930) according to an embodiment of the present disclosure.

Referring to FIG. 9, the communication protocols 900 may include, e.g., a device discovery protocol 951, a capability exchange protocol 953, a network protocol 955, and an application protocol 957.

According to an embodiment of the present disclosure, the device discovery protocol 951 may be a protocol for each electronic device (e.g., the first electronic device 910 or the second electronic device 930) to detect an external electronic device that the electronic device may communicate with or to link itself to the detected external electronic device. For example, the first electronic device 910 (e.g., the electronic device 210) may detect the second electronic device 930 (e.g., the electronic device 104) through a communication scheme (e.g., Wi-Fi, BT, or USB) available on the first electronic device 910 using the device discovery protocol 951. The first electronic device 910 may obtain and store identification information about the second electronic device 930 detected using the device discovery protocol 951 in order to establish a communication link with the second electronic device 930. The first electronic device 910 may establish such communication link with the second electronic device 930 based on, e.g., at least the identification information.

According to an embodiment of the present disclosure, the device discovery protocol 951 may be a protocol for mutual authentication between the plurality of electronic devices. For example, the first electronic device 910 may perform authentication between the first electronic device 910 and the second electronic device 930, at least, based on communication information for linkage with the second electronic device 930 (e.g., media access control (MAC) address, universally unique identifier (UUID), subsystem identification (SSID), or information provider (IP) address).

According to an embodiment of the present disclosure, the capability exchange protocol 953 may be a protocol for exchanging information relating to capabilities of services supportable by at least one of the first electronic device 910 or the second electronic device 930. For example, the first electronic device 910 and the second electronic device 930 may swap the information regarding the capabilities of the services that they are currently providing through the capability exchange protocol 953. The exchangeable information may include identification information indicating particular services supportable by the first electronic device 910 and the second electronic device 930. For example, the first electronic device 910 may receive identification information on a particular service provided by the second electronic device 930 from the second electronic device 930 through the capability exchange protocol 953. In this case, the first electronic device 910 may determine, based on the received identification information, whether the first electronic device 910 may be supportive of the particular service.

According to an embodiment of the present disclosure, the network protocol 955 may be a protocol for controlling the flow of data that is communicated between electronic devices (e.g., the first electronic device 910 and the second electronic device 930) communicably connected with each other, e.g., so that the electronic devices may provide services while interworking with each other. For example, at least one of the first electronic device 910 or the second electronic device 930 may conduct error control or data quality control using the network protocol 955. Additionally or alternatively, the network protocol 955 may determine the transmission format of data communicated between the first electronic device 910 and the second electronic device 930. At least one of the first electronic device 910 or the second electronic device 930 may manage, at least, a session (e.g., session connection or session termination) for data exchange between the first and second electronic devices 910 and 930 using the network protocol 955.

According to an embodiment of the present disclosure, the application protocol 757 may be a protocol for providing a procedure or information for exchanging data related to services offered to an external electronic device. For example, the first electronic device 910 (e.g., the electronic device 210) may provide a service to the second electronic device 930 (e.g., the electronic device 104 or the server 106) through the application protocol 957.

According to an embodiment of the present disclosure, the communication protocols 900 may be standard communication protocols, protocols designated by an individual or an organization (e.g., a communication device/system manufacturer or network provider) or combinations thereof.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

At least a part of the device (e.g., modules or their functions) or method (e.g., operations) may be implemented as instructions stored in a computer-readable storage medium e.g., in the form of a programming module. The instructions, when executed by one or more processor (e.g., the processor 210), may cause the processor to carry out a corresponding function. The computer-readable storage medium may be e.g., the memory 220. At least a part of the programming module may be implemented (e.g., executed) by e.g., the processor 210. At least a part of the programming module may include e.g., a module, program, routine, set of instructions, process, or the like for performing one or more functions.

The computer-readable storage medium may include a hardware device configured to store and perform program instructions (e.g., programming module), such as magnetic media such as hard discs, floppy discs, and magnetic tapes, optical media such as compact disc read only memories (CD-ROMs) and digital versatile discs (DVDs), magneto-optical media such as floptical disks, read only memories (ROMs), random access memories (RAMs), flash memories, and/or the like. Examples of the program instructions may include not only machine language codes but also high-level language codes which are executable by various computing means using an interpreter. The aforementioned hardware devices may be configured to operate as one or more software modules to carry out exemplary embodiments of the present disclosure, and vice versa.

As is apparent from the foregoing description, according to embodiments of the present disclosure, there are provided an electronic device and method for managing re-enrollment of an electronic device, which may simplify the initial enrollment process while minimizing security missing even when the management agent is deleted.

Further, according to embodiments of the present disclosure, even despite the user's mistake, unintentional initialization or loss, the business operator may more efficiently manage the electronic device by reenrolling the electronic device.

The embodiments herein are provided merely for better understanding of the present disclosure, and the present disclosure should not be limited thereto or thereby. It should be appreciated by one of ordinary skill in the art that various changes in form or detail may be made to the embodiments without departing from the scope of the present disclosure defined by the following claim.

What is claimed is:

1. A method for managing re-enrollment of an electronic device, the method comprising:

storing, by a processor of the electronic device, data necessary for the re-enrollment to manage the electronic device in a memory of the electronic device, wherein the stored data is not deleted even when an initialization of the electronic device occurs, and includes an identifier of the electronic device and an identifier for authentication of the electronic device;

responsive to a deletion of a pre-stored management agent in the memory is identified, reading, by the processor, the stored data in the memory;

sending, by the processor, a request to a first server for information necessary for the authentication of the electronic device based on the identifier for the authentication included in the read data;

receiving, by the processor, from the first server, the information necessary for the authentication and a file for installing a management agent corresponding to the sent request;

installing, by the processor, the management agent by using the file received from the first server;

transmitting, by the processor, to a second server a message comprising the identifier of the electronic device included in the read data to request the re-enrollment of the electronic device by using the information necessary for the authentication received from the first server, wherein the message further includes information associated with at least one function operated on the electronic device for being remotely controlled by the second server; and updating, by the processor, the data necessary for the re-enrollment upon receiving a response to the transmitted message to request the re-enrollment of the electronic device, wherein the first server is different from the second server which remotely controls the electronic device by using the installed management agent and the information associated with the at least one function.

2. The method of claim 1, wherein the message includes information for determining whether the electronic device has previously performed enrollment.

3. The method of claim 1, further comprising deleting, by the processor, the installed management agent when receiving a message to request to release the re-enrollment from one of the first server and the second server.

4. The method of claim 1, wherein the data is stored before, while, or after performing enrollment for management of the electronic device.

5. An electronic device for managing re-enrollment, the electronic device comprising:

a memory; and a processor configured to:

control the memory to store data necessary for the re-enrollment to manage the electronic device, wherein the stored data is not deleted even when an initialization of the electronic device occurs, and includes an identifier of the electronic device and an identifier for authentication of the electronic device, responsive to a deletion of a pre-stored management agent in the memory is identified, read the stored data in the memory, send to a first server a request for information necessary for the authentication of the electronic device based on the identifier for the authentication included in the read data, receive, from the first server, a file for installing a management agent and the information necessary for the authentication corresponding to the sent request, install the management agent by using the file received from the first server, transmit to a second server a message comprising the identifier of the electronic device included in the read data to request the re-enrollment of the electronic device by using the information necessary for the authentication received from the first server, wherein the message further includes information associated with at least one function operated on the electronic device and for being remotely controlled by the second server, and update the data necessary for the re-enrollment upon receiving a response to the transmitted message to request the re-enrollment of the electronic device, wherein the first server is different from the second server which remotely controls the electronic device by using the installed management agent and the information associated with the at least one function.

6. The electronic device of claim 5, further comprising an input/output interface configured to receive authentication information for installing the management agent, wherein the processor is further configured to:

compare the received authentication information with pre-stored authentication information in the memory, and responsive to the received authentication information is consistent with the pre-stored authentication information, install the management agent.

7. The electronic device of claim 5, wherein the message includes information for determining whether the electronic device has previously performed enrollment.

8. The electronic device of claim 5, wherein the processor is further configured to delete the stored data and the installed management agent when receiving a message to request to release the re-enrollment from one of the first server and the second server.

9. The electronic device of claim 5, wherein the processor is further configured to control the electronic device according to a preset default management until before the re-enrollment is complete.

10. The electronic device of claim 9, wherein when the re-enrollment is complete, the electronic device is controlled by the second server.

11. A method for managing re-enrollment of an electronic device, the method comprising:

responsive to a deletion of a pre-stored management agent in a memory of the electronic device is identified, sending, by a processor of the electronic device, a request for information necessary for authentication of the electronic device based on pre-stored data in the memory of the electronic device, to a first server, wherein the pre-stored data is not deleted even when an initialization of the electronic device occurs, and includes an identifier of the electronic device and an identifier for the authentication;

receiving, by the processor, from the first server the information necessary for the authentication and a file for installing a management agent corresponding to the sent request;

installing, by the processor, the management agent by using the file received from the first server;

transmitting, by the processor, to a second server a message comprising the identifier of the electronic device included in the pre-stored data to request the re-enrollment of the electronic device by using the information necessary for the authentication received from the first server;

receiving, by the processor, data necessary for the re-enrollment of the electronic device from the second server in response to the transmitting of the message;

re-enrolling, by the processor, to the second server based on the received data, wherein the message further includes information associated with at least one function operated on the electronic device for being remotely controlled by the second server; and updating, by the processor, the pre-stored data upon receiving a response to the transmitted message to request the re-enrollment of the electronic device, wherein the first server is different from the second server which remotely controls the electronic device by using the installed management agent and the information associated with the at least one function.

12. The method of claim 11, wherein the sending of the request for the information necessary for the authentication to the first server comprises reading, by the processor, the pre-stored data stored in the memory responsive to the deletion of the pre-stored management agent in the memory is identified.

13. The method of claim 11, further comprising generating, by the processor, the message further including information for determining whether the electronic device has previously performed enrollment.

14. The method of claim 11, further comprising deleting, by the processor, the installed management agent when receiving a message to request to release the re-enrollment from one of the first server and the second server.

15. An electronic device for managing re-enrollment, the electronic device comprising:

a memory;

a processor configured to:

responsive to a deletion of a pre-stored management agent in the memory is identified, send to a first server a request for information necessary for authentication of the electronic device based on pre-stored data in the memory, wherein the pre-stored data is not deleted even when an initialization of the electronic device occurs, and includes an identifier of the electronic device and an identifier for the authentication, receive the information necessary for the authentication and a file for installing a management agent from the first server corresponding to the sent request, install the management agent by using the file received from the first server, transmit a message comprising the identifier of the electronic device included in the pre-stored data to request the re-enrollment of the electronic device by using the information necessary for the authentication received from the first server, receive data necessary for the re-enrollment of the electronic device from the second server in response to the transmitting of the message, re-enroll to the second server based on the received data, wherein the message further includes information associated with at least one function operated on the electronic device for being remotely controlled by the second server, and update the pre-stored data upon receiving a response to the transmitted message to request the re-enrollment of the electronic device, wherein the first server is different from the second server which remotely controls the electronic device by using the installed management agent and the information associated with the at least one function.

16. The electronic device of claim 15, wherein the processor is further configured to control the electronic device according to a preset default management until before the re-enrollment is complete, and responsive to the re-enrollment is complete, the electronic device is controlled by the second server.

17. The electronic device of claim 15, wherein the processor is further configured to read the pre-stored data stored in the memory responsive to the deletion of the pre-stored management agent in the memory is identified.

18. The electronic device of claim 15, wherein the processor is further configured to generate the message further including information for determining whether the electronic device has previously performed enrollment.

19. The electronic device of claim 15, wherein the processor is further configured to delete the installed management agent when receiving a message to request to release the re-enrollment from one of the first server and the second server.

* * * * *